United States Patent
Dunum

(10) Patent No.: US 6,192,566 B1
(45) Date of Patent: Feb. 27, 2001

(54) BRAKE SINGLE OR DUAL PISTON PUSHER TOOL

(76) Inventor: Robert E Dunum, 819 N. Karlov St., Chicago, IL (US) 60651

( * ) Notice: Subject to any disclaimer, the term of this patent is extended or adjusted under 35 U.S.C. 154(b) by 0 days.

(21) Appl. No.: 09/470,239

(22) Filed: Dec. 22, 1999

(51) Int. Cl.[7] .................................................. B23P 19/04
(52) U.S. Cl. ................................ 29/239; 29/233; 29/256; 29/263
(58) Field of Search ............................ 29/239, 266, 256, 29/259, 263, 269, 233; 254/100, 101; 269/249

(56) References Cited

U.S. PATENT DOCUMENTS

| | | | | |
|---|---|---|---|---|
| 3,599,311 | * | 8/1971 | Ellis | 29/259 |
| 4,672,731 | * | 6/1987 | Taylor | 29/259 |
| 4,903,391 | * | 2/1990 | Franks | 29/239 |
| 5,018,261 | * | 5/1991 | Markous | 29/239 |

* cited by examiner

Primary Examiner—James G. Smith
Assistant Examiner—Lee Wilson

(57) ABSTRACT

A piston pushing tool for use in piston disc brake assemblies having a caliper housing with at least one piston receiving bore open at one end and closed at its opposite end in which an hollow cylindrical piston having a closed end adjacent to the open end of the bore is reciprocably disposed, and an outboard shoe support bracket spaced axially from the open end of the bore and having axially outer and inner surfaces and an opening therethrough generally aligned with the bore. The tool includes a threaded shaft having a distal end, a proximal end, and an intermediate portion. The shaft is proportioned and designed to extend axially through the opening in the support bracket. A handle is connected to the proximal end for rotating the shaft. A first plate is provided for abutting the axially inner surface of the support bracket and a second plate, connected to the distal end of the shaft and having two spaced apart U-shaped extensions, is provided for abutting the closed end of the piston. Upon rotation of the shaft, the second plate is driven away from the first plate, thereby pushing the piston fully into the at least one piston receiving bore.

1 Claim, 4 Drawing Sheets

BRAKE SINGLE OR DUAL PISTON PUSHER TOOL

FIELD OF INVENTION

This invention relates to a piston pushing tool for use in replacing worn brake pads in disc brake assemblies.

When a motorist applies pressure to the brake pedal, a piston means within a caliper mechanism works on brake pads positioned on opposite faces of the rotating disk to apply a braking force to a ground wheel.

Brake pads become worn after a duration of service, thereby necessitating their removal and replacement with new brake pads. One problem encountered during the brake pad replacement operation is retraction of the associated piston or pistons into its cylinder.

DESCRIPTION OF PRIOR ART

Many tools have been introduced for pushing pistons within disc brake assemblies. Most of these are quite complicated, and all have several problems inherent in them.

Inventors created several types of piston pushing tools for disc brake assemblies. U.S. Pat. No. 5,018,261 to Markous (1991) discloses a tool that requires manual manipulation as the tool is applied because the tool slides over and does not hold the position and has a tendency to damage the rubber housing around the piston. U.S. Pat. No. 4,903,391 to Franks (1990) requires more time because you have to advance the tool completely into the cylinder because there is no piston abutting means.

Thus, it would be desirable to provide a piston pushing tool of a simple structure which will be easily placed into the caliper housing and will push either a single piston or dual pistons until it is flush with the piston receiving bore without additional manipulation.

OBJECTS AND ADVANTAGES (a) to provide a low cost manual mechanism that can be used to readily move a brake actuation piston or dual pistons from an extended position to a retracted position, to thereby facilitate the process of replacing worn brake pads with new brake pads.

(b) to provide a mechanism that does not have to be exactly placed in order to work.

(c) to provide a mechanism that is designed so that it can be used on a variety of different disc brake constructions.

SUMMARY OF THE INVENTION

The present invention solves all the problems discussed above by providing a piston pushing tool for use in disc brake assemblies having a caliper housing providing one or two piston receiving bore(s) in which a piston is reciprocally disposed. The bore is open at one end and closed at its opposite end, and an outboard shoe support bracket is spaced axially apart from the open end. The support bracket has axially outer and inner surfaces and an opening generally aligned with the bore(s). The piston is a hollow cylindrical piston with a first end adjacent the closed end of the bore, and a second end adjacent the open end of the bore.

The tool comprises a threaded shaft having a distal end, a proximal end, and an intermediate portion. The shaft is proportioned and designed to extend axially through the opening in the support bracket.

Means are attached to the proximal end of the shaft for rotating the shaft. Means, engaged on the intermediate portion of the shaft, are provided for abutting the axially inner surface of the support bracket. The tool further comprises means, engaged on the distal end of the shaft, for abutting the second end of the piston or pistons. Upon rotation of the rotating means the piston abutting means will be driven away from the axially inner surface abutting means, thereby pushing the piston or pistons fully into the piston receiving bore or bores.

BRIEF DESCRIPTION OF THE DRAWINGS

Various features and modifications of the present invention will become apparent to those skilled in the art upon reference to the following specification and drawings, in which.

DESCRIPTION OF THE PREFERRED EMBODIMENT

Figure 1:
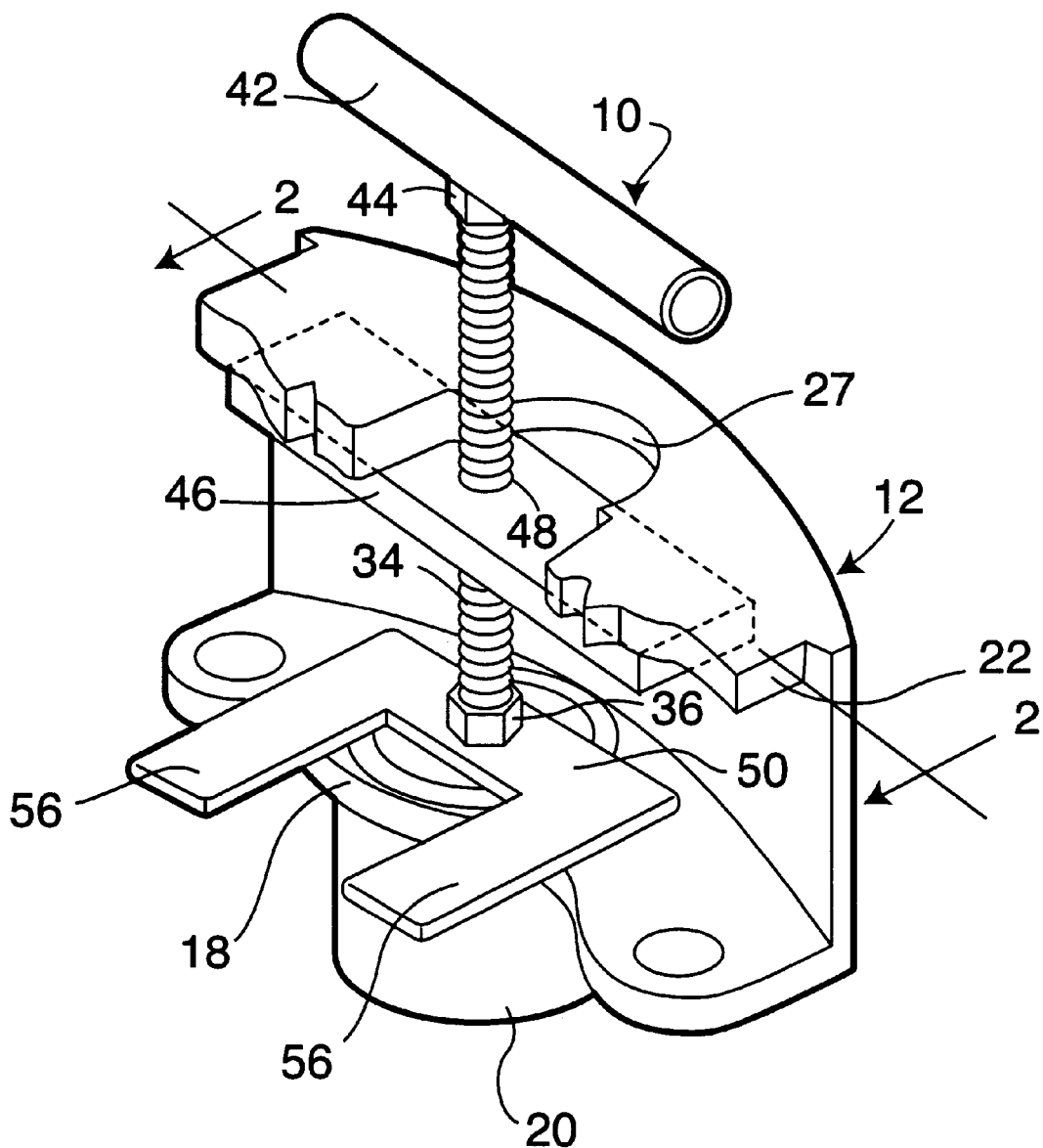
FIG. 1 is a perspective view of the present invention, shown in use in a single piston disc brake assembly, with the cylindrical foot partially cutaway showing the T-shaped section of the shaft.
Figure 2:
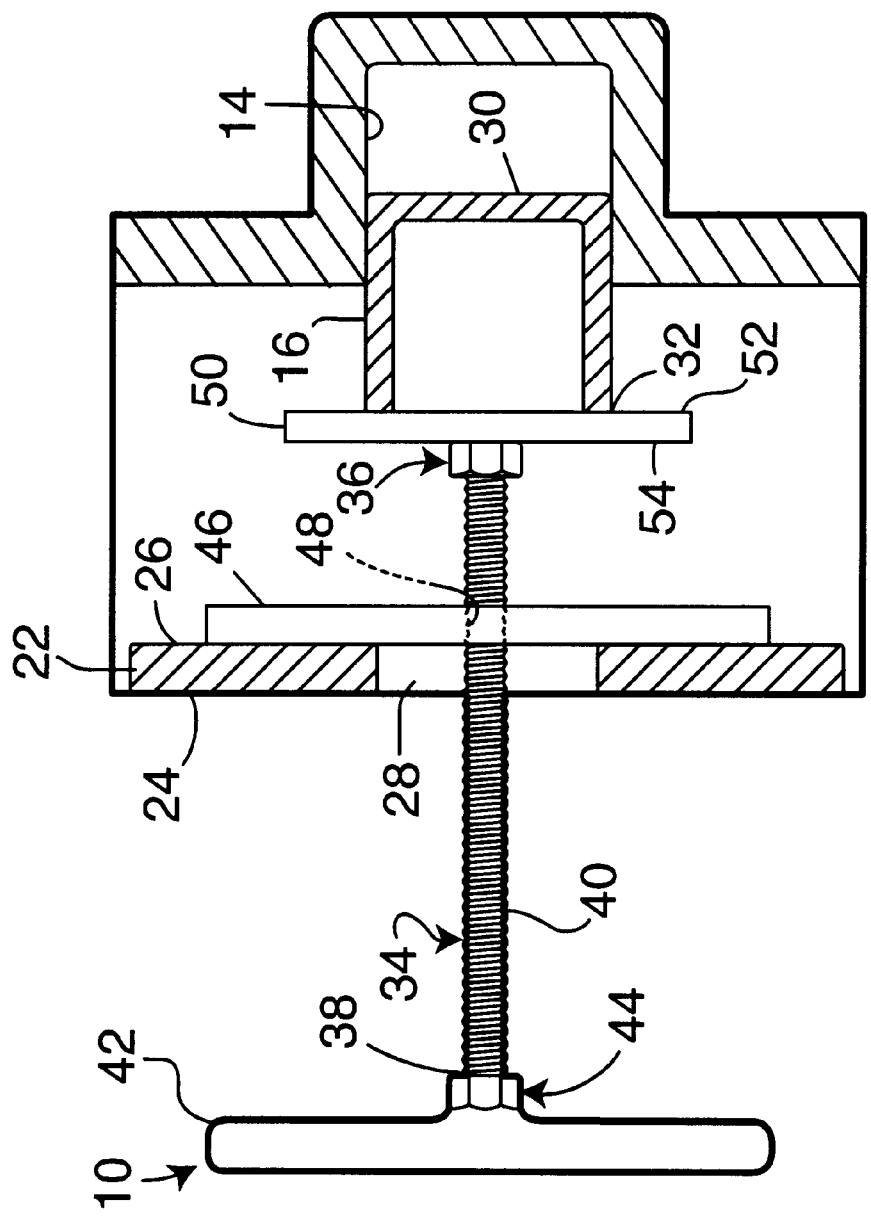
FIG. 2 is a cross sectional view taken along line 2—2 of FIG. 1, showing the piston partially of the piston receiving bore or bores.

Referring now to FIG. 1, the piston pushing tool of the present invention is designated generally as 10. Piston pushing tool 10 is adapted for use in disc brake assemblies having a caliper housing 12. Caliper housing 12 provides a piston receiving bore 14 in which a piston 16 is reciprocably disposed, as best seen in FIG. 2. Bore 14 is open at one end 18 and has axially outer and inner surfaces, 24, 26 respectively. An opening 28 extends through show suport bracket 22, and is generally aligned with bore 14. Piston 16 is a hollow cylindrical piston with a first end 30 adjacent the closed end 20 of bore 14, and a second end 32 adjacent open end 18 of bore 14.

Tool 10 comprises a threaded shaft 34 having a distal end 36, and a proximal end 38, and an intermediate portion 40. Shaft 34 is proportioned and designed to extend axially through opening 28 in support bracket 22.

Means, attached to proximal end 38 of shaft 34, are provided for rotating shaft 34. Means are provided, engaged on intermediate portion 40 of shaft 34, for abutting axially inner surface 26 of support bracket 22.

Means, engaged on distal end 36 of shaft 34 are provided abutting second end 32 of piston 16. Upon rotation of the rotating means, the piston abutting means will be driven away from the axially inner surface abutting means, thereby pushing piston 16 fully into the piston receiving bore 14. The second end 32 of piston 16 is open, and the piston abutting means is non rotational. In addition, the axially inner surface abutting means is threadingly engaged on intermediate shaft portion 40.

Figure 3:
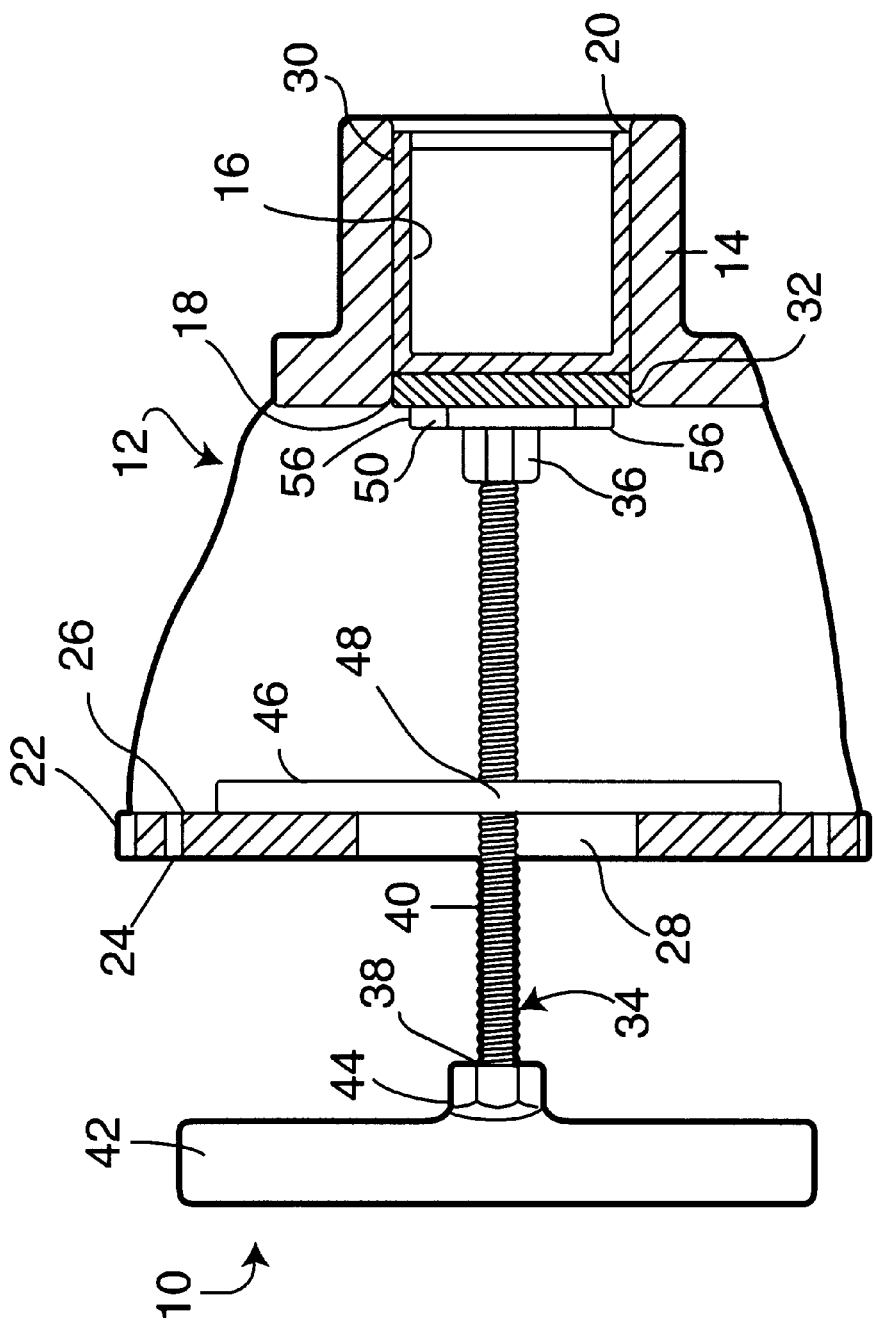
FIG. 3 is a perspective view of the invention, shown in use in a dual piston brake assembly, with the cylindrical foot partially cutaway showing the T-shaped section of the shaft.
Figure 4:
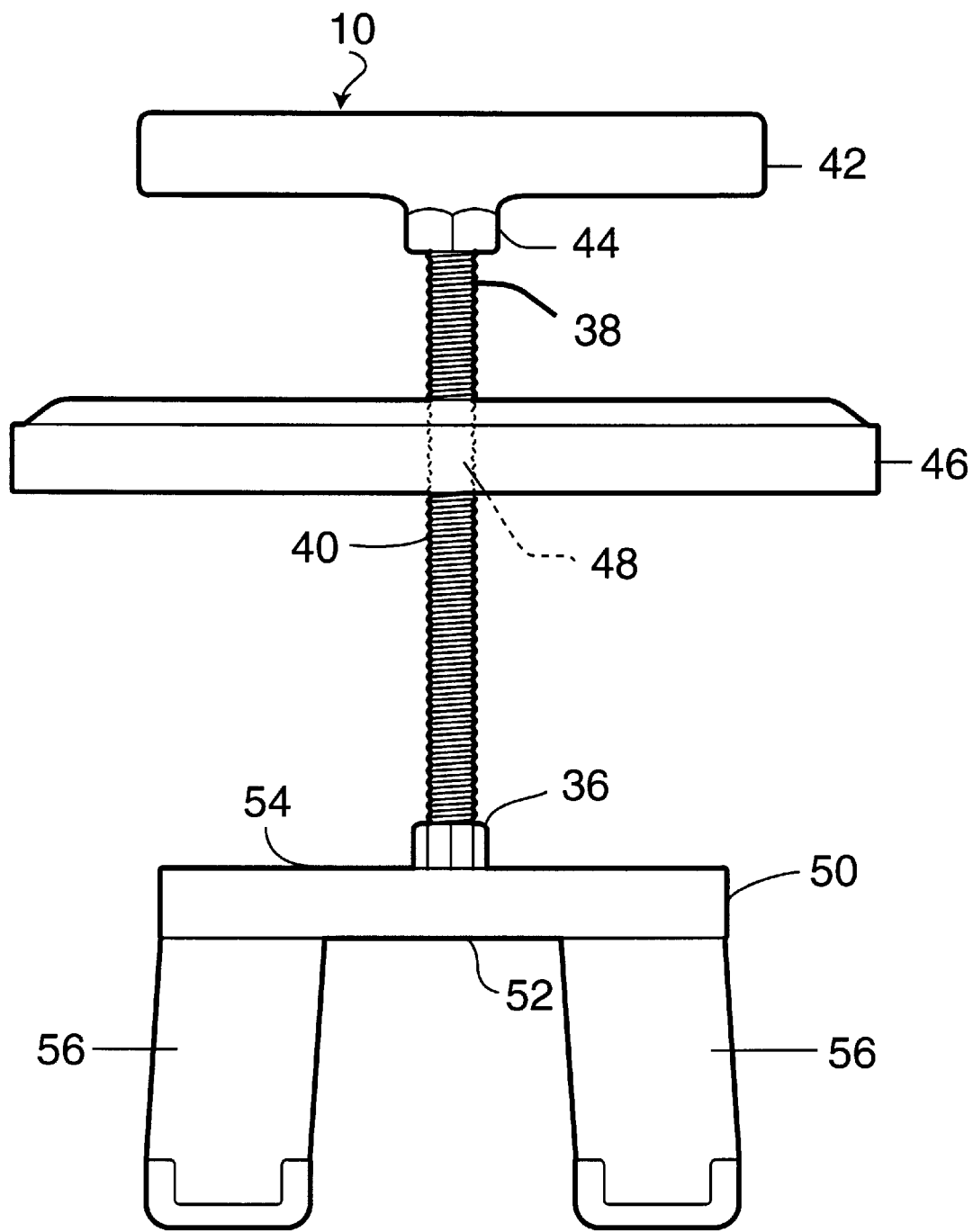
FIG. 4 is a side view of the present invention.

The rotating means comprises a hollow cylindrical handle 42 as best seen in FIGS. 1 and 3. The axially inner surface abutting means can comprise any suitable means. This means is a first plate 46, having dimensions larger than the diameter of the opening 28. First plate 46 has a threaded aperture 48 therein which threadingly engages threaded shaft 34.

The piston abutting means may comprise any suitable means, but this means is a second plate 50 having dimensions larger than the diameter of the open end 32 of piston 16. The second plate 50 has an axially inner surface 52 facing the piston 16 and an axially outer surface 54 facing distal end 36 of shaft 34. The piston abutting means further comprises two U-shaped extensions 56 for use with dual piston brake assemblies.

While the invention has been described in detail, it will be apparent to those skilled in the art that the disclosed embodiments may be modified. Therefore, The foregoing description is to be considered exemplary rather than limiting, and the true scope of the invention is that defined in the following claims.

What is claimed is:

1. A piston pushing tool for use in piston disc brake assemblies having a caliper housing providing at least one piston receiving bore in which a piston is reciprocably disposed, the bore being open at one end and closed at its opposite end, and an outboard shoe support bracket spaced axially apart from the open end and having axially outer and inner surfaces and an opening therethrough generally aligned with the bore, the piston being a hollow cylindrical piston with a first end adjacent the closed end of the bore, and a second end adjacent the open end of the bore, the second end being closed and having an axially inner surface and an axially outer surface, the tool comprising:

a threaded shaft having a distal end, a proximal end, and an intermediate portion, the shaft being proportioned and designed to extend axially through the opening in the support bracket;

means, attached to the proximal end of the shaft, for rotating the shaft;

means, engaged on the intermediate portion of the shaft, for abutting the axially inner surface of the support bracket; and a second plate for abutting the second end of the piston, the second plate having a first surface, a second surface and two spaced apart U-shaped extensions, the second surface being attached to the distal end of the shaft;

wherein upon rotation of the rotating means, the second plate will be driven away from the axially inner surface abutting means, thereby pushing the piston fully into the at least one piston receiving bore.

* * * * *